W. N. RETTINGER.
TIRE.
APPLICATION FILED FEB. 1, 1918.
1,262,259.
Patented Apr. 9, 1918.
2 SHEETS—SHEET 2.
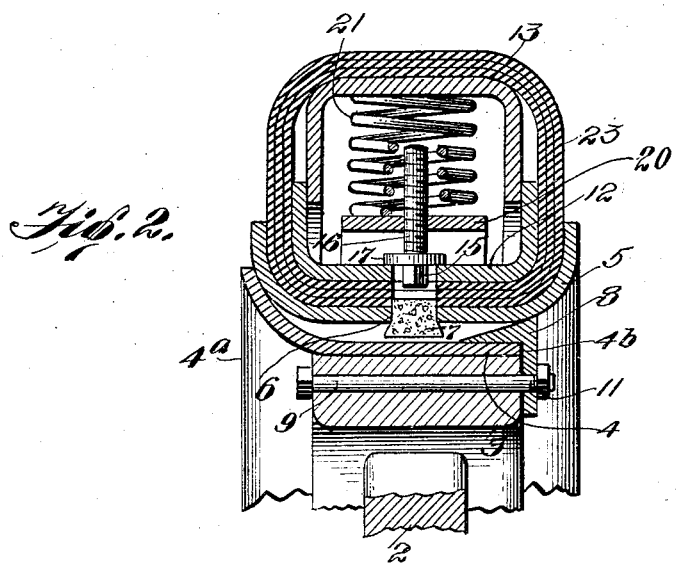
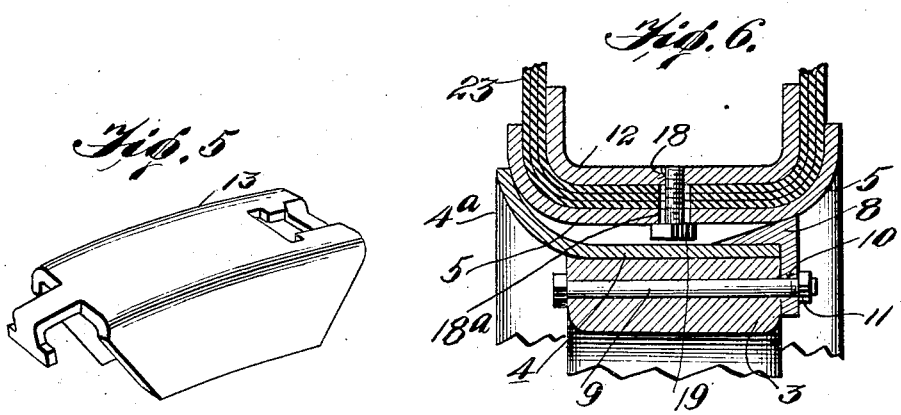

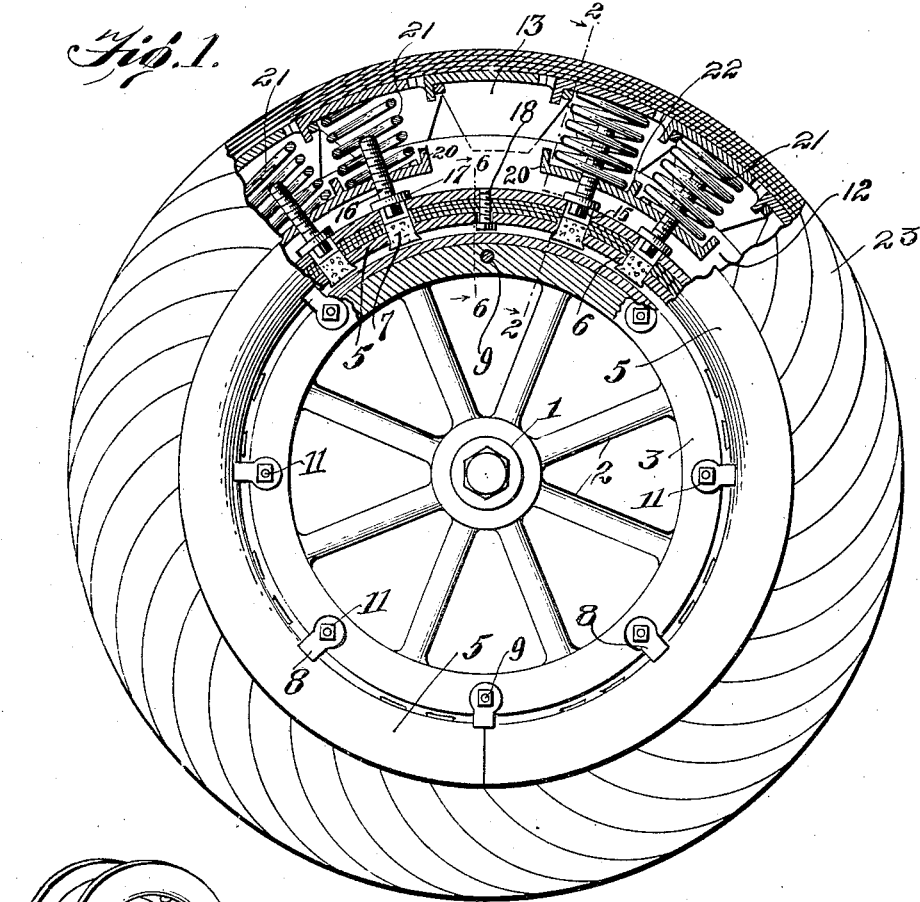
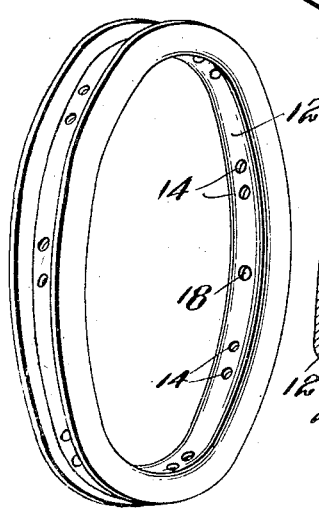
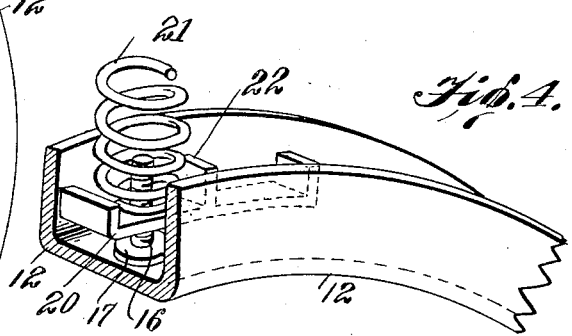

UNITED STATES PATENT OFFICE.

WILLIAM N. RETTINGER, OF BOURBON, INDIANA.

TIRE.

1,262,259.

Specification of Letters Patent.

Patented Apr. 9, 1918.

Application filed February 1, 1918. Serial No. 214,916.

*To all whom it may concern:*

Be it known that I, WILLIAM N. RETTINGER, a citizen of the United States of America, residing at Bourbon, in the county of Marshall and State of Indiana, have invented certain new and useful Improvements in Tires, of which the following is a specification, reference being had therein to the accompanying drawings.

This invention relates to automobile tires, and has for its object the production of a simple and efficient tire, which will eliminate the necessity of employing air for producing the resiliency thereof to the greatest degree.

Another object of my invention is the improvement of the tire disclosed in my prior United States Patent No. 1,214,590, issued February 6, 1917.

With these and other objects in view, my invention consists of certain other novel constructions, combinations and arrangements of parts, as will be hereinafter fully described and claimed.

In the drawings:

Figure 1 is a view in side elevation, partly in longitudinal section, of a tire constructed in accordance with the present invention.

Fig. 2 is a transverse sectional view taken on line 2—2, Fig. 1, looking in the direction of the arrow.

Fig. 3 is a perspective view of the channel rim of my invention.

Fig. 4 is an enlarged, fragmentary, sectional view of the channel rim, shown in Fig. 3, and showing one of the spring plates and a spring positioned thereon.

Fig. 5 is a perspective view of one of the tread links.

Fig. 6 is a transverse sectional view taken on line 6—6, Fig. 1, looking in the direction of the arrow.

Fig. 7 is a perspective view of one of the cam buttons.

Referring to the drawings by numerals, 1 designates the hub, and 2 the spokes of an ordinary motor vehicle wheel, and upon the outer ends of the spokes 2 is mounted the felly 3.

Carried upon the outer face of the felly is an annular metallic felly-rim 4, which felly-rim 4 is provided with a curved flanged portion 4ª at one side, and at its opposite side or edge 4ᵇ, it is flush with one of the sides of the felly 3, Fig. 2.

An intermediate split rim 5, substantially U-shaped in cross-section, is placed around the primary or felly-rim 4, the intermediate rim 5 being provided with side flanges for holding the body structure of the tire hereinafter described in position upon the wheel when completed, although when the intermediate flanged rim 5 is removed from the wheel by reason of said rim 5 being split, the rim can be removed off of the body of the tire, and then the tire body can be examined freely or repaired if desired, or if found necessary.

The intermediate rim 5 is provided with alined central apertures 6 (Figs. 1 and 2) which apertures are normally closed by any suitable stopper means, such for instance as corks 7. The function of these apertures 6 will be hereinafter described. To retain the intermediate flanged rim 5 upon the felly 3 and the felly rim 4, after the intermediate rim 5 has been shoved or placed in the position clearly shown in Fig. 2, causing one of the flanged edges of rim 5 to engage the flanged edge 4ª of the felly-rim, a number of cam buttons 8 are forced in between the felly-rim 4 and the intermediate rim 5 (Figs. 1, 2 and 6) and bolts 9 extending transversely through the felly 3, are placed in the apertures 10 of the depending portion of the cam buttons 8, and nuts 11 are screwed upon the bolts 9, thereby securely retaining the cam buttons in position upon the wheel, and consequently holding the intermediate flanged split rim 5 in position, which also retains the body of my improved tire in position as shown in the drawings.

The body structure of my improved tire comprises an annular channel-rim 12, substantially U-shaped in cross-section (Fig. 3), and a chain of tread links 13. The tread links are similarly constructed to those links disclosed in my U. S. Patent No. 1,214,590, issued February 6, 1917, and reference may be had to this patent for detail information as to the structure of the tread links.

The tread links 13 preferably slide within the flanged edges of the channel-rim 12 (Fig. 2). The channel-rim 12 is provided with apertures 14 for receiving the squared heads 15 of threaded bolts 16, Figs. 1 and 2. Each bolt is provided with an integral washer portion 17, resting upon the inner face of the channel-rim 12.

The channel-rim 12 is also provided with a centering aperture 18, which centering aperture 18 registers with a similarly constructed aperture 18ª formed upon the intermediate rim 5, Fig. 6, so that a centering bolt 19 can be placed in aperture 18ª when the threaded end of the bolt 19 is threaded into the centering aperture of the rim 12. This registering of the apertures 18 and 18ª will cause the apertures 14 of the rim 12 to register with the similarly constructed apertures 6 formed in the intermediate rim 5, in which apertures 6 are positioned the cork stoppers 7 for keeping water, dirt, or any foreign substance or object from working into the interior of the completed tire body.

Mounted upon each pair of bolts 16 (Fig. 1) is a spring supporting plate 20, which plate 20 is provided with threaded apertures, into which are threaded the threaded extensions of the bolts 16, for adjusting the plates 20 to increase or decrease the torsional strain upon coil-springs 21, which coil-springs 21 are mounted between the plates 20 and the tread links 13. Each spring supporting plate 20 is provided with flanged ends and with a flange 22 intermediate its ends, which flanges constitute pockets for one end of the coil-springs 21 for keeping the springs in a true operable position, as illustrated in Fig. 1. Around the channel-rim 12 and the tread links 13 is spirally wound a suitable fabric 23, as for instance, canvas, and after the fabric 23 has been wound or wrapped around said channel-rim 12 and tread links 13, the surface of said fabric can be coated or covered with rubber or vulcanized in any desired manner for further increasing the efficiency of my improved tire.

At the registering apertures 6 and 14, as well as the apertures 18 and 18ª, apertures or openings must be cut in the fabric 23, so that the centering bolt can be placed in position, (Fig. 6) and also so that the heads 15 of the spring plate adjusting bolts 16 can be left free, since it is desired, at times, to remove the intermediate rim 5, carrying the tire body, then removing the cork stopper 7, and through the medium of an ordinary T-wrench or other tool, the heads 15 of bolts 16 are rotated, thereby rotating said bolts carrying the plates, and hence adjusting the tension or strain of the springs 21, as it is found expedient or necessary during the life of my improved tire. After the adjustment of the spring supporting plates and the springs, carried thereby, is accomplished by rotating the bolts as stated, through the medium of any suitable tool extending through the registering apertures, the cork stoppers 7 are placed in position as shown in the drawings, and the intermediate rim 5 is placed upon the wheel as shown and described, and is locked in position by the cam buttons 8 and the securing bolts 9.

From the foregoing description it will be noted that I have produced a very efficient tire, including metallic means for keeping the tire in an excellent expanded condition, as if it were a pneumatic tire heavily inflated, and I have provided very simple means for positioning or assembling all of the parts, as well as the placing of the same upon the felly of a wheel or the removal thereof when desired.

It is to be understood that the spring plate adjusting bolts are arranged in pairs, two bolts to each plate, and that as many plates and bolts may be used as the constructor desires. Further I have shown a series of cam buttons, but more or less than the number shown can be used as the constructor desires without departing from the spirit and scope of this invention.

I wish it to be understood that I reserve the right to make such alterations and changes to my invention as will be obvious to one skilled in the art to which this invention relates, and as will fairly fall within the scope of the appended claims.

What I claim is:

1. In a tire of the class described, the combination with a felly, of a tire body, means fastening said tire body on said felly, said tire body comprising an annular channel-rim, a chain of tread links surrounding said channel-rim, pairs of bolts rotatably mounted upon said channel rim, a spring supporting plate carried by the bolts of each pair, said plate provided with flanged ends and with an intermediate flange, a pair of coil-springs mounted upon each plate between said flanges and normally exerting an outward pressure upon said tread links, and a covering for said channel-rim and said tread links.

2. In a tire of the class described, the combination with a felly, a felly-rim secured upon said felly, of an intermediate rim positioned around said felly-rim, means spacing said intermediate rim from said felly-rim, a tire body positioned upon said intermediate rim, springs in said tire body, means for adjusting the tension of said springs, said intermediate rim and tire body provided with registering apertures, means centering said rim and tire body for causing said apertures to register, said registering apertures also registering with the means for adjusting the tension of the springs, and detachable means carried in the apertures of the intermediate rim for closing the registering apertures and thereby preventing foreign substance from penetrating to the interior of the tire body.

3. In a tire of the class described, the combination with a felly, of a tire body surrounding said felly, means supporting said tire body on said felly, said tire body comprising tread links and a channel-rim, said channel-rim provided with apertures, bolts provided with heads, said heads positioned in said apertures, each bolt provided with an integral washer portion resting upon the channel-rim, spring supporting plates carried by said bolts, springs interposed between the tread links and said plates, and removable stopper means covering the heads of said bolts.

4. In a tire of the class described, the combination with a felly, of a felly-rim mounted upon said felly, an intermediate rim U-shaped in cross-section positioned around said felly-rim, means detachably securing said intermediate rim upon said felly-rim, said intermediate rim provided with pairs of stopper receiving apertures and with a centering aperture, a tire body positioned upon said intermediate rim, said tire body provided with springs, means for adjusting said springs, said body provided with apertures into which said adjusting means project, said last-mentioned apertures adapted to register with the pairs of apertures formed in said intermediate rim, said tire body provided with a centering aperture adapted to register with the centering aperture of said intermediate rim, and a bolt normally seated in the centering aperture of said intermediate rim and the centering aperture of said tire body, thereby causing the other apertures of said tire body and said intermediate rim to register.

In testimony whereof I hereunto affix my signature.

WILLIAM N. RETTINGER.

Copies of this patent may be obtained for five cents each, by addressing the "Commissioner of Patents, Washington, D. C."